United States Patent Office 3,631,167
Patented Dec. 28, 1971

1

3,631,167
3-INDENYLMETHYLTETRAZOLES
Tsung-Ying Shen, Westfield, and Conrad P. Dorn, Jr., Plainfield, N.J., assignors to Merck & Co., Inc., Rahway, N.J.
No Drawing. Continuation of application Ser. No. 692,296, Dec. 21, 1967. This application July 16, 1970, Ser. No. 56,986
Int. Cl. C07d 55/56
U.S. Cl. 260—240 D                6 Claims

ABSTRACT OF THE DISCLOSURE

This invention relates to the preparation of 3-indenylmethyltetrazoles and intermediates thereof. The compounds of this invention are useful as anti-inflammatory agents and may be used in the treatment of diseases which are susceptible to such agents.

CROSS REFERENCES TO RELATED APPLICATIONS

This is a continuation of Ser. No. 692,296 filed Dec. 21, 1967.

SUMMARY OF THE INVENTION

This invention relates to new indenyltetrazoles, intermediates thereof, process for preparing the same, and their method of treatment as medicinal agents. The disclosed class of compounds in this invention exhibit anti-inflammatory activity and are effective in the prevention and inhibition of edema and granuloma tissue formation. They also possess a useful degree of anti-pyretic and analgesic activity.

BACKGROUND OF THE INVENTION

There has been much research carried on in the past two decades for development of anti-flammatory drugs. As a result, a great many new drugs have been synthesized. Most of these have been steroids of the 11-oxygenated pregnane series. These, while highly effective, have the drawback of causing many side effects. There has also been a concentrated effort in anti-inflammatory research in the indole series with the result of many useful drugs.

We have found that the 3-indenylmethyltetrazoles of this invention are valuable anti-inflammatory agents and can easily be prepared.

DESCRIPTION AND PREFERRED EMBODIMENTS

This invention relates to a new class of chemical compounds which contain a tetrazolyl radical attached through a methylene or substituted methylene radical to a substituted 1-benzylidenyl-3-indene and further relates to its non-toxic pharmaceutically acceptable salts. This invention further describes novel methods of preparation to the instant compounds.

In a more narrow aspect, the present invention embraces the novel compounds having the following structural formulae as shown in FIG. I and to novel intermediates thereof as shown in FIGS. II and IV:

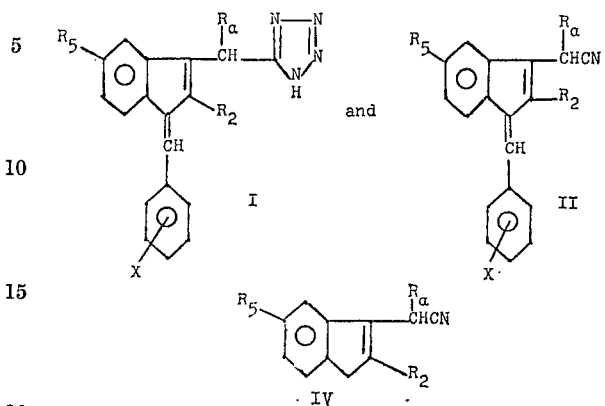

wherein $R_2$ is hydrogen or alkyl (preferably lower alkyl such as methyl, ethyl, propyl, etc.);
$R_a$ is hydrogen or alkyl (preferably lower alkyl such as methyl, ethyl, propyl, etc.);
$R_5$ is alkoxy (preferably lower alkoxy such as methoxy, ethoxy, propoxy, etc.), alkenoxy (preferably loweralkenoxy such as allyloxy, etc.), halogen (preferably chloro, bromo and fluoro, etc.), nitro, amino, mono- and dialkylamino (preferably mono- and dilower-alkylamino (such as methylamino, dimethylamino, methylethylamino, ethylamino, diethylamino, etc.), alkyl (preferably lower alkyl such as methyl, ethyl, propyl, etc.), and hydroxy;
X is halogen (preferably chloro, bromo, fluoro, etc.), mercapto, alkylthio (preferably loweralkylthio such as methylthio, ethylthio, etc.), alkylsulfenyl (preferably lower alkylsulfenyl such as methylsulfenyl, ethylsulfenyl, etc.), alkylsulfonyl (preferably lowersulfonyl such as methylsulfonyl, ethylsulfonyl, etc.), trihalomethyl (preferably trifluoromethyl), trihalomethylthio (preferably trifluoromethylthio), trihalomethoxy (preferably trifluoromethoxy), nitro, dialkylamino (preferably diloweralkylamino such as dimethylamino, diethylamino, methylethylamino, etc.), which may be substituted at any position of the phenyl ring (preferably at the para position).

The more preferred compounds of this invention relate to the 5-(1-benzylidenyl-3-indenylmethyl) tetrazoles and salts thereof of Formula I wherein $R_2$ is hydrogen or alkyl;
$R_a$ is hydrogen or alkyl;
$R_5$ is alkoxy or dialkylamino; and
X is p-chloro or p-methylthio.

Further preferred compounds of this invention relate to the 3-indenylacetonitriles and 1-benzylidenyl-3-indenylacetonitrile intermediates of Formulae IV and II wherein $R_2$ is hydrogen or alkyl;
$R_a$ is hydrogen or alkyl;
$R_5$ is alkoxy or dialkylamino; and
X is p-chloro or p-methylthio.

Representative compounds of this invention are as follows:

5-(1-p-chlorobenzylidenyl-2-methyl-5-methoxy-3-indenylmethyl)-tetrazole
5-(1-p-chlorobenzylidenyl-2-methyl-5-dimethylamino-3-indenylmethyl)-tetrazole
5-(1-p-methylthiobenzylidenyl-2-methyl-5-methoxy-3-indenylmethyl)-tetrazole
5-(1-p-methylthiobenzylidenyl-2-methyl-5-dimethylamino-3-indenylmethyl)-tetrazole
α-(1-p-chlorobenzylidenyl-2-methyl-5-methoxy-3-indenyl)-acetonitrile
α-(1-p-chlorobenzylidenyl-2-methyl-5-dimethylamino-3-indenyl)-acetonitrile
α-(1-p-methylthiobenzylidenyl-2-methyl-5-methoxy-3-indenyl)-acetonitrile
α-(1-p-methylthiobenzylidenyl-2-methyl-5-dimethylamino-3-indenyl)-acetonitrile
5-(1-p-chlorobenzylidenyl-2-methyl-5-nitro-3-α-indenylethyl)-tetrazole
5-(1-p-methylthiobenzylidenyl-2-methyl-5-nitro-3-indenylmethyl)-tetrazole
α-(1-p-chlorobenzylidenyl-2-methyl-5-dimethylamino-3-indenyl)-propionitrile
5-(1-p-chlorobenzylidenyl-2-methyl-5-methoxy-3-α-indenyl-ethyl)-tetrazole
5-(1-p-methylthiobenzylidenyl-2-methyl-5-methoxy-3-α-indenylethyl)-tetrazole.

A further aspect of this invention embraces a method of treatment of inflammation by the administration of compounds having the structural formula:

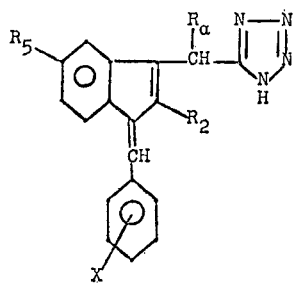

wherein $R_2$ is hydrogen or alkyl (preferably lower alkyl such as methyl, ethyl, propyl, etc.);

$R_a$ is hydrogen or alkyl (preferably lower alkyl such as methyl, ethyl, propyl, etc.);

$R_5$ is alkoxy (preferably lower alkoxy such as methoxy, ethoxy, propoxy, etc.), halogen (preferably chloro, bromo and fluoro, etc.), nitro, amino, mono- and dialkylamino (preferably mono- and diloweralkylamino (such as methylamino, dimethylamino, methylethylamino, ethylamino, diethylamino, etc.), alkyl (preferably lower alkyl such as methyl, ethyl, propyl, etc.), and hydroxy;

X is halogen (preferably chloro, bromo, fluoro, etc.), mercapto, alkylthio (preferably lower alkylthio such as methylthio, ethylthio, etc.), alkylsulfonyl (preferably loweralkylsulfonyl such as methylsulfonyl, ethylsulfonyl, etc.), trihalomethyl (preferably trifluoromethyl), nitro, dialkylamino (preferably diloweralkylamino such as dimethylamino, diethylamino, methylethylamino, etc.), which may be substituted at any position of the phenyl ring (preferably at the para position).

We have found that the 5-(3-indenylmethyl)-tetrazole compounds of this invention have a useful degree of antiinflammatory activity and are effective in the treatment of arthritic and dermatological disorders and in like conditions which are responsive to treatment with anti-inflammatory agents. They also possess a useful degree of anti-pyretic and analgesic activity. The instant 3-indenylmethyltetrazole compounds have considerable utility because of good solubility, few side effects and a favorable therapeutic index. These compounds are normally administered orally in tablets or capsules, the optimum dosage depending, of course, on the particular compound being used and the type and severity of the condition being treated. Although the optimum quantities of the compounds of this invention to be used in such manner will depend on the compound employed and the particular type of disease condition treated, oral dose levels of preferred compounds in the range of 0.5–30 mg./kg. (preferably in the range of 1–10 mg./kg. per day) are useful in control of arthritic conditions, depending on the activity of the specific compound and the reaction sensitivity of the patient.

Various tests in animals have been carried out to show the ability of compounds of this invention to exhibit reactions that can be correlated with anti-inflammatory actiivty in humans. One such test used is the carrageenin testing method which is known to correlate well with anti-inflammatory activity in humans and is a standard test used to determine anti-inflammatory activities. This test shows the ability of compounds to inhibit edema induced by injection of an inflammatory agent into the tissue of the foot of a rat against non-inflamed controls. This is outlined in detail by C. A. Winter, Proc. Soc. Exptl. Biolog. & Med., 1962, III, 544. This correlation has been shown by the activities of compounds known to be clincally active, including Indocin, Aspirin, Butazolidin, Tandearil, Cortone, Hydrocortone, Decadron. In view of the results of this test, the instant compounds can be considered to be active anti-inflammatory agents. Another test used to show the ability of the instant compounds to inhibit edema is the Adjuvant arthritis test. This testing method is also known to correlate with anti-inflammatory activity in humans. The results of this test also show that the instant compounds can be considered active anti-inflammatory agents.

The 3-indenylacetonitriles II and IV of this invention are useful intermediates in preparing the instant tetrazoles. The 5-(1-benzylidenyl-3-indenylmethyl)-tetrazoles I and claimed intermediates II and IV of this invention are conveniently prepared by the following methods:

Method I (a) The reaction of an available appropriately substituted α-(1-benzylidenyl-3-indenyl)-acetamide III with a suitable dehydrating agent (such as phosphorus pentoxide, thionyl chloride, or phosphorus oxychloride) using conventional methods results in the appropriately substituted α-(1-benzylidenyl-3-indenyl)-acetonitrile II.

(b) These nitriles can then be treated with a triazide compound (preferably sodium azide) to give the desired substituted 5-(1-benzylidenyl-3-indenylmethyl)-tetrazoles I. The conversion of the nitriles to the tetrazoles can be carried out in a solvent (preferably a polar solvent such as dimethylformamide, acetic acid, butanol, etc.) in the presence of ammonium or substituted ammonium chloride at elevated temperatures from about 50–150° C. (preferably in the range of 100–125° C.) for a period of time from a few hours to a few days depending on the substituents present.

The following equation illustrate this method of preparation:

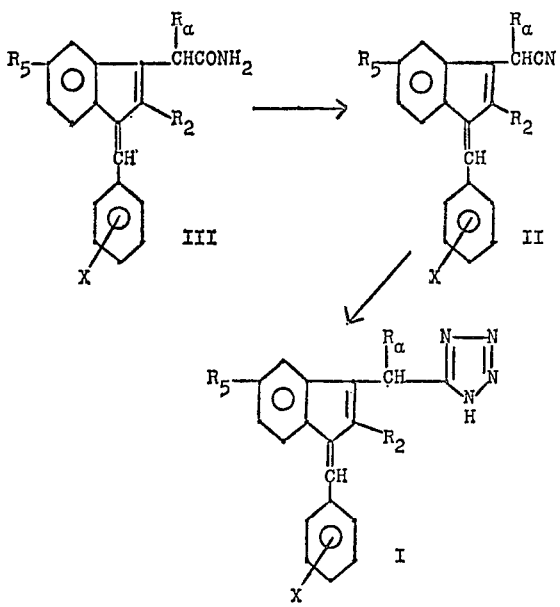

where $R_2$, $R_a$, $R_5$ and $X$ are as defined above.

Method II

An alternate method is:

(a) The reaction of an available appropriately substituted indanone V with cyano acetic acid or a substituted cyano acetic acid (preferably a lower alkyl substituted cyano acetic acid such as α-cyanopropionic acid, 2-cyanobutyric acid, etc.) followed by subsequent decarboxylation. This reaction can be carried out by conventional methods using a solvent (preferably a polar solvent such as acetic acid, etc.) and heating at elevated temperatures of about 50–150° C. (preferably in the range of 100–125° C.) for a period of time from a few hours to several hours depending on the substituents present. The desired substituted indenylacetonitrile IV is formed directly.

(b) The benzylidenyl group can then be introduced into the indenyl acetonitrile IV by the reaction with a substituted benzaldehyde using a strong base (such as sodium or potassium hydroxide, sodamide, etc.) as a catalyst. The reaction can be carried out in a solvent (preferably a polar solvent such as aqueous methanol, dimethylether, dimethylformamide, etc.) and warmed if necessary to afford the desired substituted α-(1-benzylidenyl-3-indenyl)-acetonitriles II.

(c) The 5-tetrazole can then be prepared using the reaction conditions of Method I.

The following equations illustrate this method of preparation:

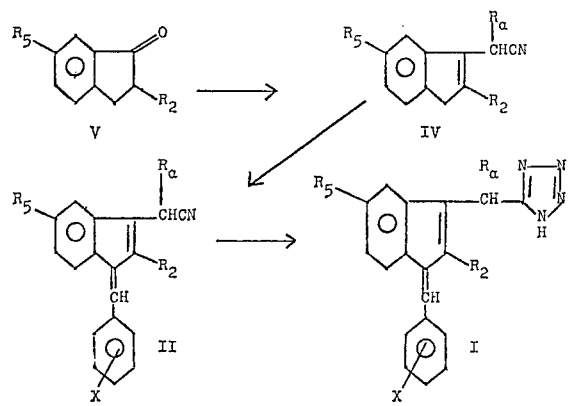

Appropriately desired end products having various $R_5$ or X substituents can be prepared by using suitable reactions in order to convert one group to another.

It is often convenient in preparing the instant compounds to use a nitro substituent in the 5 position of the indene nucleus and convert it later to a desired substituent since by this route a great many substituents can be prepared. This can be accomplished by reduction of the nitro to the amino group followed by use of the Sandmeyer type reactions to introduce a chlorine, bromine, xanthate, hydroxyl, or alkoxyl group. The xanthate can then lead to the mercapto by hydrolysis, this in turn can be alkylated to an alkylthio group which can be oxidized to alkylsulfenyl and alkylsulfonyl groups. These reactions may be carried out at any stage of the synthesis.

The starting materials employed in the foregoing methods have previously been prepared. The various α-(1-benzylidenyl-3-indenyl)-acetamides III can be prepared by the procedures outlined by Charles A. Winter and Tsung-Ying Shen, U.S. Patents Nos. 3,325,358 and 3,312,730. The syntheses of the indanones V can be found in Holland Patent No. 6,618,446.

The following are a group of detailed examples which show the preparation of the desired compounds of this invention. They are to be construed as illustrations of the invention and not as limitations thereof.

EXAMPLE 1

α-(2-Methyl-5-methoxy-3-indenyl) acetonitrile

The following materials are added together in a reaction vessel: 2-methyl-6-methoxyindanone (8.84 g., 0.05 m.), cyano acetic acid (4.7 g., 0.055 m.), acetic acid, glacial, (3.0 g., 0.05 m.), ammonium acetate (0.77 g., 0.01 m.), and benzene (7 ml.). The mixture is then heated and stirred at an internal temperature of 100–110° C. for 23 hours. The majority of the benzene and water which is formed is removed. The reaction is then continued for 3 hours at 130–135° C. The mixture is then cooled to room temperature and diluted with 50 ml. of methylene chloride. This methylene chloride solution is then washed with two 50 ml. portions of water and then dried over sodium sulfate and evaporated in vacuo. Methyl alcohol is then added to the residue and stirred and the product filtered (M.P. 108–109° C.).

When α-cyanopropionic acid is used in place of cyano acetic acid in the above example, then the product is α-(2-methyl-5-methoxy-3-indenyl)-propionitrile.

EXAMPLE 2

α-(1-p-chlorobenzylidenyl-2-methyl-5-methoxy-3-indenyl)-acetonitrile

To a solution of 25 ml. of 90% methanol containing 2.24 g. (.04 m.) of potassium hydroxide is added 4 g. (.02 m.) of α-(2 - methyl-5-methoxy-3-indenyl)-acetonitrile followed by 4.26 g. (0.03 m.) of p-chlorobenzaldehyde. The mixture is stirred and refluxed under a nitrogen atmosphere for 5 hours. The solution is then cooled to 60° C. and 25 ml. of 50% acetic acid added. This solution is then cooled to 10° C. for 1 hour and the crude product filtered, washed three times with 15 ml. portions of 50% acetic acid and then with water. The product is then dried in vacuo.

EXAMPLE 3

5-(1-p-chlorobenzylidenyl-2-methyl-5-methoxy-3-indenyl-methyl)-tetrazole

A mixture of 6.42 g. (0.02 m.) of 1-p-chloro-benzylidene - 5 - methoxy-2-methyl-3-indenyl-acetonitrile, 1.7 g. (0.026 m.) of sodium azide and 1.4 g. (0.25 m.) of ammonium chloride in 55 ml. of dry dimethylformamide is heated for 16 hours at 120° under nitrogen. The reactive mixture is then concentrated in vacuo and the residue dissolved in 75 ml. of 2.5 N sodium hydroxide and diluted with 150 ml. of water. The aqueous solution is then washed with ether, acidified and extracted with methylene chloride. The methylene chloride extracts are dried over sodium sulfate and concentrated in vacuo to give the desired product.

EXAMPLE 4

α-(1-p-chlorobenzylidenyl-2-methyl-5-dimethylamino-3-indenyl)-propionitrile

To a cooled suspension of α-(1-p-chlorobenzylidenyl-2-methyl - 5-dimethylamino-3-indenyl)-propioamide 8.8 g. (.024 m.) in 50 ml. of phosphorus oxychloride is added 4.8 g. (0.048 m.) of triethylamine. This reaction mixture is then reuxed for one hour and then the excess phosphorus oxychloride is evaporated off under reduced pressure. This is then dissolved in chloroform and washed with an aqueous potassium carbonate solution and then with water. The chloroform solution is then dried over sodium sulfate and concentrated in vacuo to give the desired nitrile.

EXAMPLE 5

When the procedure of Example 1 is followed but substituting for 2 - methyl-6-methoxyindanone an equimolar amount of the substituted indanones of Table I below, there is obtained each of the corresponding aceto- and propionitriles of Table II below:

TABLE I

| | |
|---|---|
| 6-methoxyindanone | 6-dimethylaminoindanone |
| 6-allyloxyindanone | 2methyl-6-nitroindanone |
| 6-chloroindanone | 2,6-dimethylindanone |
| 6-hydroxyindanone | 2-methylindanone |
| 6-nitroindanone | 2-ethylindanone |
| 6-aminoindanone | 2-ethyl-6-methoxyindanone |
| 6-methylindanone | |

TABLE II

| | |
|---|---|
| α-(5-methoxy-3-indenyl)-acetonitrile | α-(5-methoxy-3-indenyl)-propionitrile. |
| α-(5-allyloxy-3-indenyl)-acetonitrile | α-(5-allyloxy-3-indenyl)-propionitrile. |
| α-(5-chloro-3-indenyl)-acetonitrile | α-(5-chloro-3-indenyl)-propionitrile. |
| α-(5-hydroxy-3-indenyl)-acetonitrile | α-(5-hydroxy-3-indenyl)-propionitrile. |
| α-(5-nitro-3-indenyl)-acetonitrile | α-(5-nitro-3-indenyl)-propionitrile. |
| α-(5-methyl-3-indenyl)-acetonitrile | α-(5-methyl-3-indenyl)-propionitrile. |
| α-(2-methyl-5-nitro-3-indenyl)-acetonitrile | α-(2-methyl-5-nitro-3-indenyl)-propionitrile. |
| α-(2,5-dimethyl-3-indenyl)-acetonitrile | α-(2,5-dimethyl-3-indenyl)-propionitrile. |
| α-(2-methyl-3-indenyl)-acetonitrile | α-(2-methyl-3-indenyl)-propionitrile. |
| α-(2-ethyl-3-indenyl)-acetonitrile | α-(2-ethyl-3-indenyl)-propionitrile. |
| α-(2-ethyl-5-methyl-3-indenyl)-acetonitrile | α-(2-ethyl-5-methyl-3-indenyl)-propionitrile. |

EXAMPLE 6

When the procedure of Example 2 is followed but substituting an equimolar amount of each of the nitriles of Table II, Example 5, for α-(2 - methyl-5-methoxy-3-indenyl)-acetonitrile, then the corresponding 1 - p-chlorobenzylidenyl compound is synthesized and found in Table I below:

TABLE I

| | |
|---|---|
| α-(1-p-chlorobenzylidenyl-5-methoxy-3-indenyl)acetonitrile | α-(1-p-chlorobenzylidenyl-5-methoxy-3-indenyl)propionitrile. |
| α-(1-p-chlorobenzylidenyl-5-allyloxy-3-indenyl)acetonitrile | α-(1-p-chlorobenzylidenyt-5-allyloxy-3-indenyl)propionitrile. |
| α-(1-p-chlorobenzylidenyl-5-cloro-3-indenyl)acetonitrile | α-(1-p-chlorobenzylidenyl-5-chloro-3-indenyl)propionitrile. |
| α-(1-p-chlorobenzylidenyl-5-hydroxy-3-indenyl)acetonitrile | α-(1-p-chlorobenzylidenyl-5-hydroxy-3-indenyl)propionitrile. |
| α-(1-p-chlorobenzylidenyl-5-nitro-3-indenyl)acetonitrile | α-(-1-p-chlorobenzylidenyl-5-nitro-3-indenyl)propionitrile. |
| α-(1-p-chlorobenzylidenyl-5-methyl-3-indenyl)acetonitrile | α-(1-p-chlorobenzylidenyl-5-methyl-3-indenyl)propionitrile. |
| α-(1-p-chlorobenzylidenyl-2-methyl-5-nitro-3-indenyl)-acetonitrile | α-(1-p-chlorobenzylidenyl-2-methyl-5-nitro-3-indenyl)propionitrile. |
| α-(1-p-chlorobenzylidenyl)-2,5-dimethyl-3-indenyl)-acetonitrile | α-(1-p-chlorobenzylidenyl)-2,5-dimethyl-3-indenyl)-propionitrile. |
| α-(1-p-chlorobenzylidenyl)-2-ethyl-3-indenyl)-acetonitrile | α-(1-p-chlorobenzylidenyl)-2-ethyl-3-indenyl)-propionitrile. |
| α-(1-p-chlorobenzylidenyl)-2-ethyl-5-methoxy-3-indenyl)-acetonitrile | α-(1-p-chlorobenzylidenyl)-2-ethyl-5-methoxy-3-indenyl)-propionitrile. |

EXAMPLE 7

When the procedure of Example 2 is followed but substituting an equimolar amount of each of the substituted benzaldehydes of Table I below for p-chlorobenzaldehyde, there is obtained the corresponding 1-substituted benzylidenyl compound:

TABLE I o-chlorobenzaldehyde
m-chlorobenzaldehyde
p-chlorobenzaldehyde
o-fluorobenzaldehyde
m-fluorobenzaldehyde
p-fluorobenzaldehyde
p-bromobenzaldehyde
p-methylthiobenzaldehyde
p-ethylthiobenzaldehyde
p-methylsulfenylbenzaldehyde
p-methylsulfonylbenzaldehyde
p-ethylsulfonylbenzaldehyde
m-trifluoromethylbenzaldehyde
p-trifluoromethylbenzaldehyde
p-trifluoromethylthiobenzaldehyde
m-nitrobenzaldehyde
p-nitrobenzaldehyde
p-trifluoromethoxybenzaldehyde
p-dimethylaminobenzaldehyde
m-diethylaminobenzaldehyde
p-diethylaminobenzaldehyde

EXAMPLE 8

When each of the known corresponding α-indenylamides are substituted for α-(1 - p-chlorobenzylidenyl-2-methyl-5-dimethylamino-3-indenyl)-propionamide following the procedure of Example 4, then the corresponding α-indenylnitriles of Table I below are prepared:

TABLE I

α-(1-p-chloromethylbenzylidenyl-5-methoxy-3-indenyl)-propionitrile

α-(1-p-thiomethylbenzylidenyl-2-methyl-5-dimethylamino-3-indenyl)-acetonitrile

α-(1-p-thiomethylbenzylidenyl-2-methyl-5-dimethylamino-3-indenyl)-propionitrile

α-(1-p-chlorobenzylidenyl-2-methyl-5-dimethylamino-3-indenyl)-acetonitrile

α-(1-p-chlorobenzylidenyl-2-methyl-5-dimethylamino-3-indenyl)-propionitrile

α-(1-p-thiomethylbenzylidenyl-2-methyl-5-methoxy-3-indenyl)-acetonitrile

α-(1-p-thiomethylbenzylidenyl-2-methyl-5-methoxy-3-indenyl)-propionitrile

α-(1-p-chlorobenzylidenyl-2-methyl-5-methoxy-3-indenyl)-acetonitrile

α-(1-p-chlorobenzylidenyl-2-methyl-5-methoxy-3-indenyl)-propionitrile

α-(1-(p-thiomethylbenzylidenyl-2-methyl-5-nitro-3-indenyl)-acetonitrile

α-(1-p-thiomethylbenzylidenyl-2-methyl-5-nitro-3-indenyl)-propionitrile

α-(1-p-chlorobenzylidenyl-2-methyl-5-nitro-3-indenyl)-acetonitrile

α-(1-p-chlorobenzylidenyl-2-methyl-5-nitro-3-indenyl)-propionitrile

α-(1-m-trifluoromethylbenzylidenyl-2-methyl-5-methoxy-3-indenyl)-acetonitrile

α-(1-p-trifluoromethylbenzylidenyl-2-methyl-5-methoxy-3-idenyl)-acetonitrile

α-(1-m-chlorobenzylidenyl-2-methyl-5-methoxy-3-indenyl)-acetonitrile

α-(1-o-chlorobenzylidenyl-2-methyl-5-methoxy-3-indenyl)-acetonitrile

α-(1-p-trifluoromethylbenzylidenyl-2-methyl-5-dimethylamino-3-indenyl)-acetonitrile
α-(1-p-trifluoromethylthiobenzylidenyl-2-methyl-5-methoxy-3-indenyl)-acetonitrile
α-(1-p-trifluoromethoxybenzylidenyl-2-methyl-5-methoxy-3-indenyl)-acetonitrile
α-(1-p-dimethylaminobenzylidenyl-2-methyl-5-methoxy-3-indenyl)-acetonitrile
α-(1-p-methylsulfonylbenzylidenyl-2-methyl-5-bromo-3-indenyl)-acetonitrile
α-(1-p-methylsulfenylbenzylidenyl-2-methyl-5-hydroxy-3-indenyl)-acetonitrile
α-(1-p-chlorobenzylidenyl-2-methyl-5-amino-3-indenyl)-acetonitrile
α-(1-p-chlorobenzylidenyl-2-methyl-5-methylamino-3-indenyl)-acetonitrile
α-(1-p-chlorobenzylidenyl-2,5-dimethyl-3-indenyl)-acetonitrile

EXAMPLE 9

When Example 3 is followed but substituting for 1-p-chlorobenzylidenyl-2-methyl-5-methoxy-3-indenylmethylnitrile each of the compounds listed in Table I of Example 8 and Table I of Example 6, there is obtained the corresponding tetrazoles listed in Table I below:

TABLE I 5-(1-p-chloromethylbenzylidenyl-5-methoxy-3-indenylmethyl-α-methyl)-tetrazole
5-(1-p-methylthiobenzylidenyl-2-methyl-5-dimethylamino-3-indenylmethyl)-tetrazole
5-(1-p-methylthiobenzylidenyl-2-methyl-5-dimethylamino-3-indenylmethyl-α-methyl)-tetrazole
5-(1-p-chlorobenzylidenyl-2-methyl-5-dimethylamino-3-indenylmethyl)-tetrazole
5-(1-p-chlorobenzylidenyl-2-methyl-5-dimethylamino-3-indenylmethyl-α-methyl)-tetrazole
5-(1-p-methylthiobenzylidenyl-2-methyl-5-methoxy-3-indenylmethyl)-tetrazole
5-(1-p-methylthiobenzylidenyl-2-methyl-5-methoxy-3-indenylmethyl-α-methyl)-tetrazole
5-(1-p-chlorobenzylidenyl-2-methyl-5-methoxy-3-indenylmethyl)-tetrazole
5-(1-p-chlorobenzylidenyl-2-methyl-5-methoxy-3-indenylmethyl-α-methyl)-tetrazole
5-(1-p-methylthiobenzylidenyl-2-methyl-5-nitro-3-indenylmethyl)-tetrazole
5-(1-p-methylthiobenzylidenyl-2-methyl-5-nitro-3-indenylmethyl-α-methyl)-tetrazole
5-(1-p-chlorobenzylidenyl-2-methyl-5-nitro-3-indenylmethyl)-tetrazole
5-(1-p-chlorobenzylidenyl-2-methyl-5-nitro-3-indenylmethyl)-tetrazole
5-(1-m-trifluoromethylbenzylidenyl-2-methyl-5-methoxy-3-indenylmethyl)-tetrazole
5-(1-p-trifluoromethylbenzylidenyl-2-methyl-5-methoxy-3-indenylmethyl)-tetrazole
5-(1-m-chlorobenzylidenyl-2-methyl-5-methoxy-3-indenylmethyl)-tetrazole
5-(1-o-chlorobenzylidenyl-2-methyl-5-methoxy-3-indenylmethyl)-tetrazole
5-(1-p-trifluoromethylbenzylidenyl-2-methyl-5-dimethylamino-3-indenylmethyl)-tetrazole
5-(1-p-trifluoromethylthiobenzylidenyl-2-methyl-5-methoxy-3-indenylmethyl)-tetrazole
5-(1-p-trifluoromethoxybenzylidenyl-2-methyl-5-methoxy-3-indenylmethyl)-tetrazole
5-(1-p-dimethylaminobenzylidenyl-2-methyl-5-methoxy-3-indenylmethyl)-tetrazole
5-(1-p-methylsulfonylbenzylidenyl-2-methyl-5-bromo-3-indenylmethyl)-tetrazole
5-(1-p-methylsulfenylbenzylidenyl-2-methyl-5-hydroxy-3-indenylmethyl)-tetrazole
5-(1-p-chlorobenzylidenyl-2-methyl-5-amino-3-indenylmethyl)-tetrazole
5-(1-p-chlorobenzylidenyl-2-methyl-5-methylamino-3-indenylmethyl)-tetrazole
5-(1-p-chlorobenzylidenyl-2,5-dimethyl-3-indenylmethyl)-tetrazole
5-(1-p-chlorobenzylidenyl-5-methoxy-3-indenylmethyl)-tetrazole
5-(1-p-chlorobenzylidenyl-5-nitro-3-indenylmethyl)-tetrazole
5-(1-p-chlorobenzylidenyl-5-nitro-3-indenylmethyl-α-methyl)-tetrazole
5-(1-p-chlorobenzylidenyl-5-allyloxy-3-indenylmethyl)-tetrazole
5-(1-p-chlorobenzylidenyl-5-allyloxy-3-indenylmethyl-α-methyl)-tetrazole
5-(1-p-chlorobenzylidenyl-5-chloro-3-indenylmethyl)-tetrazole
5-(1-p-chlorobenzylidenyl-5-chloro-3-indenylmethyl-α-methyl)-tetrazole
5-(1-p-chlorobenzylidenyl-5-hydroxy-3-indenylmethyl)-tetrazole
5-(1-p-chlorobenzylidenyl-5-hydroxy-3-indenylmethyl-α-methyl)-tetrazole
5-(1-p-chlorobenzylidenyl-5-methyl-3-indenylmethyl)-tetrazole
5-(1-p-chlorobenzylidenyl-5-methyl-3-indenylmethyl-α-methyl)-tetrazole
5-(1-p-chlorobenzylidenyl-2,5-dimethyl-3-indenylmethyl)-tetrazole
5-(1-p-chlorobenzylidenyl-2,5-dimethyl-3-indenylmethyl-α-methyl)-tetrazole
5-(1-p-chlorobenzylidenyl-2-ethyl-3-indenylmethyl)-tetrazole
5-(1-p-chlorobenzylidenyl-2-ethyl-3-indenylmethyl-α-methyl)-tetrazole
5-(1-p-chlorobenzylidenyl-2-ethyl-5-methoxy-3-indenylmethyl)-tetrazole
5-(1-p-chlorobenzylidenyl-2-ethyl-5-methoxy-3-indenylmethyl-α-methyl)-tetrazole

EXAMPLE 10

The following tablet composition is illustrative of the compositions of this invention.

Five thousand tablets for oral use, each containing 10 mg. of 5-(1-p-chlorobenzylidenyl-2-methyl-5-methoxy-3-indenylmethyl)-tetrazole are prepared from the following types and amounts of materials:

| Ingredient: | Grams |
|---|---|
| 5-(1-p-chlorobenzylidenyl-2-methyl-5-methoxy-3-indenylmethyl)-tetrazole | 50 |
| Lactose, U.S.P. | 600 |
| Sucrose, powdered, U.S.P. | 600 |
| Cornstarch, U.S.P. | 150 |

The finely powdered materials are mixed well and the mixture is granulated with 10% starch paste. The wet mass is forced through an 8-mesh screen, dried at 45° C. in a forced-air oven and then put through a 12-mesh screen. As lubricant, 15 grams of magnesium stearate is added before compressing into tablets.

We claim:

1. A member selected from the group of compounds having the formula:

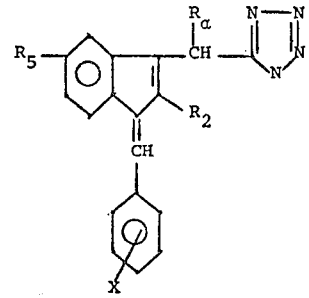

wherein
- $R_2$ is hydrogen or loweralkyl;
- $R_a$ is hydrogen or loweralkyl;
- $R_5$ is loweralkoxy, loweralkenoxy, halogen, nitro, amino, mono- and diloweralkylamino, loweralkyl or hydroxy; and
- X is halogen, mercapto, loweralkylthio, loweralkylsulfenyl, loweralkylsulfonyl, trifluoromethyl, trifluoromethylthio, trifluoromethoxy, nitro or dimethylamino.

2. A compound according to claim 1 wherein $R_2$ is hydrogen or loweralkyl, $R_a$ is hydrogen or loweralkyl, $R_5$ is loweralkoxy or diloweralkylamino, and X is halo or loweralkylthio.

3. A compound according to claim 1 wherein $R_2$ is methyl, $R_a$ is hydrogen, $R_5$ is methoxy and X is p-chloro.

4. A compound according to claim 1 wherein $R_2$ is methyl, $R_a$ is hydrogen, $R_5$ is dimethylamino and X is p-chloro.

5. A compound according to claim 1 wherein $R_2$ is methyl, $R_a$ is hydrogen, $R_5$ is methoxy and X is p-methylthio.

6. A compound according to claim 1 wherein $R_2$ is methyl, $R_a$ is hydrogen, $R_5$ is dimethylamino and X is p-methylthio.

References Cited
UNITED STATES PATENTS 3,417,096  12/1968  Juby _____ 260—308

HENRY R. JILES, Primary Examiner

G. T. TODD, Assistant Examiner

U.S. Cl. X.R.

260—465, 558; 424—269